United States Patent
Zhang et al.

(10) Patent No.: US 8,848,742 B2
(45) Date of Patent: Sep. 30, 2014

(54) TRANSMISSION STRATEGY IN MBSFN SUBFRAMES

(75) Inventors: Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 844 days.

(21) Appl. No.: 12/889,145

(22) Filed: Sep. 23, 2010

(65) Prior Publication Data

US 2011/0090983 A1    Apr. 21, 2011

Related U.S. Application Data

(60) Provisional application No. 61/251,951, filed on Oct. 15, 2009.

(51) Int. Cl.
*H04L 27/00* (2006.01)
*H04L 27/26* (2006.01)

(52) U.S. Cl.
CPC .................................. *H04L 27/2607* (2013.01)
USPC .......................................................... 370/476

(58) Field of Classification Search
CPC ............ H04L 27/2607; H04L 27/2666; H04L 27/2678
USPC ......... 370/476, 208, 328, 465, 281, 295, 330, 370/343

See application file for complete search history.

(56) References Cited

U.S. PATENT DOCUMENTS

| | | | |
|---|---|---|---|
| 2006/0176966 A1* | 8/2006 | Stewart et al. | 375/260 |
| 2008/0043613 A1* | 2/2008 | Yang et al. | 370/208 |
| 2008/0232395 A1* | 9/2008 | Buckley et al. | 370/465 |
| 2009/0016268 A1* | 1/2009 | Yi et al. | 370/328 |

OTHER PUBLICATIONS

International Search Report and Written Opinion—PCT/US2010/052383—International Search Authority, European Patent Office, Feb. 2, 2011.
Kun Yan, et al., "A novel adaptive prefix interval scheme for MIMO OFDM systems", Circuits and Systems, 2009. ISCAS 2009. IEEE International Symposium on, IEEE, Piscataway, NJ, USA, May 24, 2009, pp. 2798-2801. XP031479825, ISBN: 978-1-4244-3827-3 paragraph [III.C]; figure 2.
Taiwan Search Report—TW099134940—TIPO—Oct. 13, 2013.

* cited by examiner

*Primary Examiner* — Thai Nguyen
(74) *Attorney, Agent, or Firm* — Paul Kuo

(57) ABSTRACT

Certain aspects of the present disclosure relate to techniques for adjusting transmission gap between Multicast Broadcast Single Frequency Network (MBSFN) symbols and non-MBFSN symbols within a MBSFN subframe.

32 Claims, 6 Drawing Sheets

TRANSMISSION STRATEGY IN MBSFN SUBFRAMES

CLAIM OF PRIORITY UNDER 35 U.S.C. §119

The present Application for Patent claims benefit of U.S. Provisional Patent Application No. 61/251,951, entitled, "Transmission strategy in MBSFN subframes", filed Oct. 15, 2009, and assigned to the assignee hereof and hereby expressly incorporated by reference herein.

BACKGROUND

1. Field

Certain aspects of the present disclosure generally relate to wireless communications and, more particularly, to a method for adjusting a transmission gap between Multicast Broadcast Single Frequency Network (MBSFN) data and non-MBFSN data within a MBSFN subframe.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for wireless communications. The method generally includes utilizing a cyclic prefix (CP) of a first length for a control portion in a subframe, utilizing a CP of a second length different than the first length for a data portion in the subframe, and adjusting a gap between the control portion and the data portion within the subframe, wherein the gap is due to utilizing the CPs of first and second lengths.

Certain aspects of the present disclosure provide an apparatus for wireless communications. The apparatus generally includes at least one processor, and a memory coupled to the at least one processor, wherein the at least one processor is configured to utilize a cyclic prefix (CP) of a first length for a control portion in a subframe, utilize a CP of a second length different than the first length for a data portion in the subframe, and adjust a gap between the control portion and the data portion within the subframe, wherein the gap is due to utilizing the CPs of first and second lengths.

Certain aspects of the present disclosure provide an apparatus for wireless communications. The apparatus generally includes means for utilizing a cyclic prefix (CP) of a first length for a control portion in a subframe, means for utilizing a CP of a second length different than the first length for a data portion in the subframe, and means for adjusting a gap between the control portion and the data portion within the subframe, wherein the gap is due to utilizing the CPs of first and second lengths.

Certain aspects of the present disclosure provide a computer program product. The computer program product generally includes a computer-readable medium comprising code for utilizing a cyclic prefix (CP) of a first length for a control portion in a subframe, utilizing a CP of a second length different than the first length for a data portion in the subframe, and adjusting a gap between the control portion and the data portion within the subframe, wherein the gap is due to utilizing the CPs of first and second lengths.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
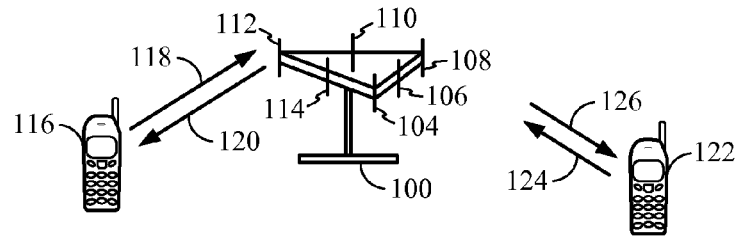
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is now an integral part of uplink multiple access scheme in the 3GPP LTE and the Evolved UTRA.

An access point ("AP") may comprise, be implemented as, or known as NodeB, Radio Network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link. The wireless node may comprise an access point, a relay, or an access terminal.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 104 and 106, where antennas 104 and 106 transmit information to access terminal 122 over forward link 126 and receive information from access terminal 122 over reverse link 124. In a FDD system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
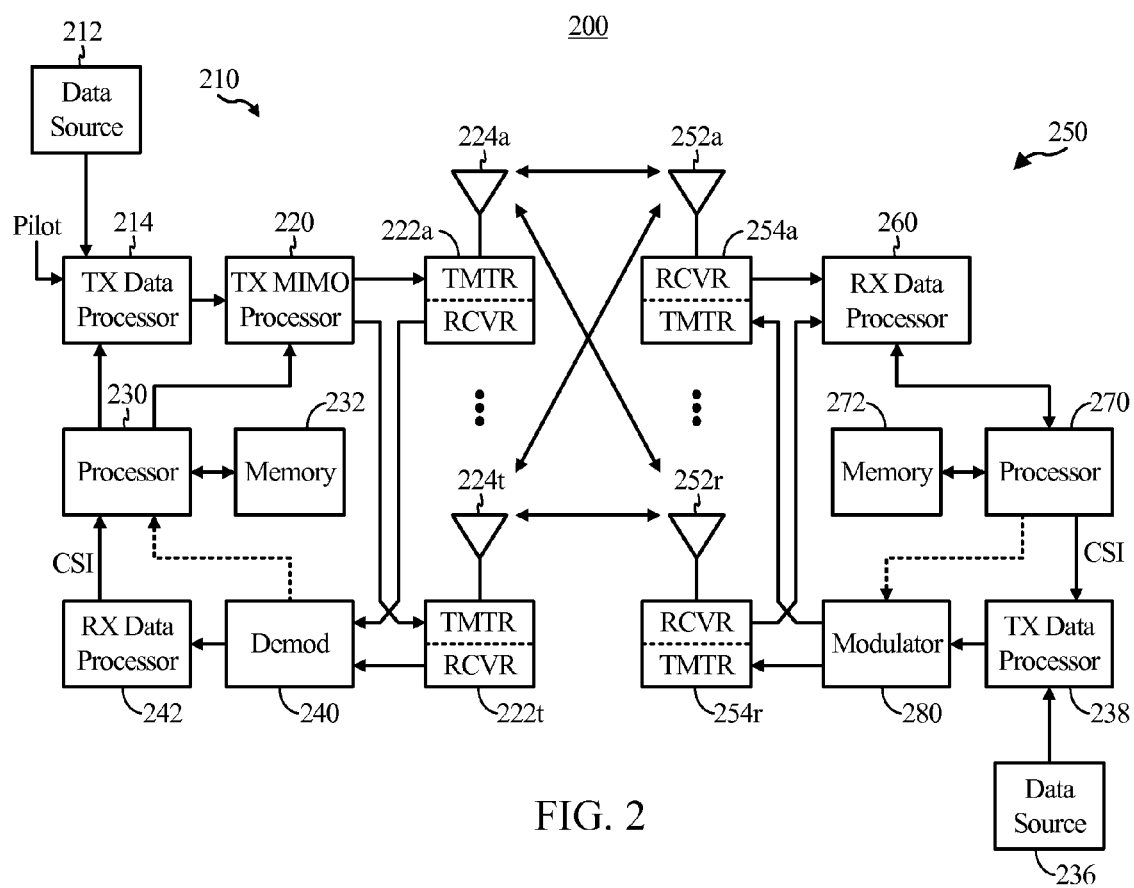
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using Orthogonal Frequency Division Multiplexing (OFDM) techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
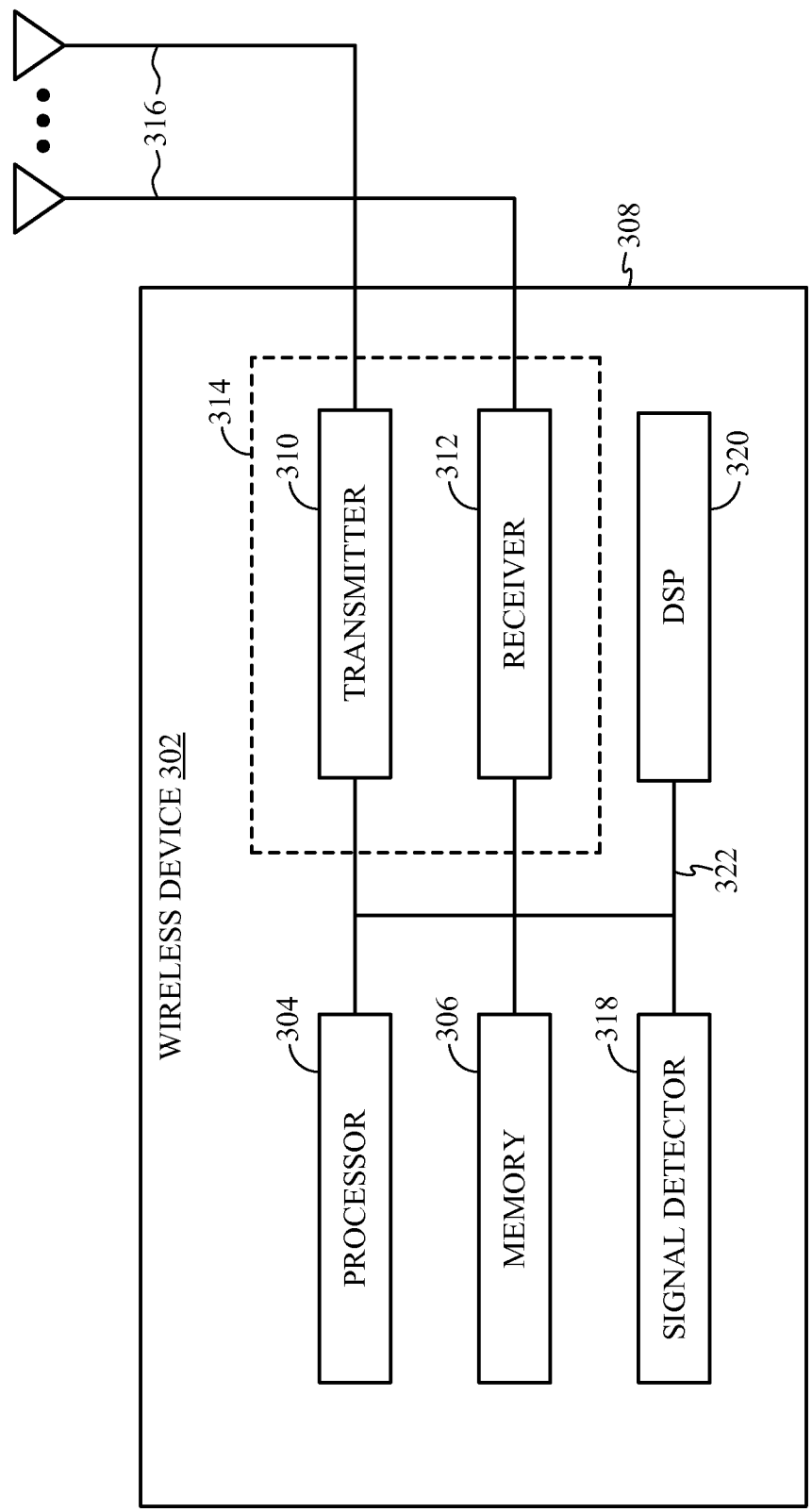
FIG. 3 illustrates a block diagram of an example wireless device in accordance with certain aspects of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 100 from FIG. 1 or any of access terminals 116, 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

In an aspect, a channel structure is provided (at any given time, the channel is contiguous or uniformly spaced in frequency) that preserves low PAPR properties of a single carrier waveform.

Transmission of MBSFN and Non-MBSFN Data

Figure 4:
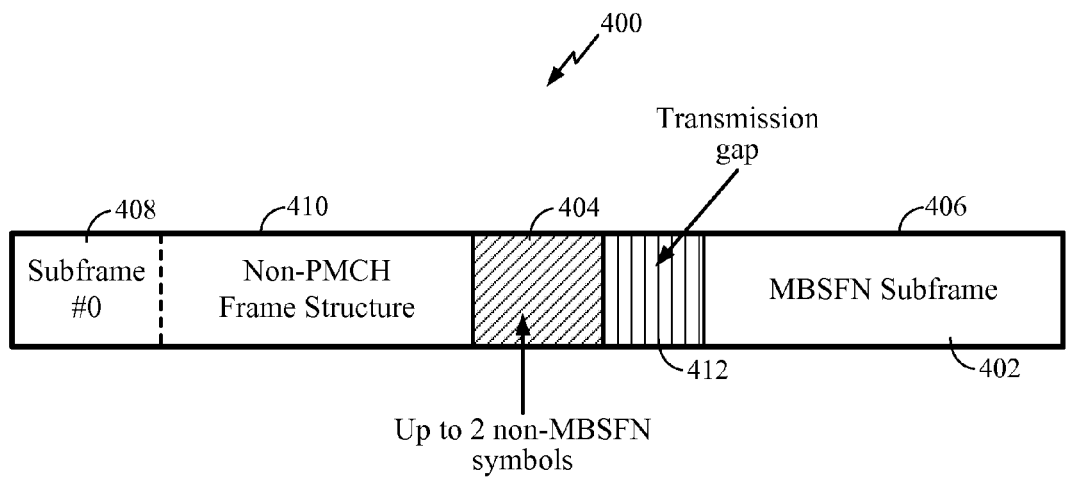
FIG. 4 illustrates an example of transmitting Multicast Broadcast Single Frequency Network (MBSFN) data along with non-MBSFN symbols in accordance with certain aspects of the present disclosure.

FIG. 4 illustrates an example frame structure 400 comprising Multicast Broadcast Single Frequency Network (MBSFN) data 402 transmitted along with non-MBSFN symbol(s) 404 within a MBSFN subframe 406 in accordance with certain aspects of the present disclosure. The frame structure 400 may be transmitted on a forward link (downlink) by at least one of: the access point 100 from FIG. 1, the access point 210 from FIG. 2, or the wireless device 302 from FIG. 3.

In LTE Release-8, on a carrier supporting a mix of Physical Downlink Shared Channel (PDSCH) and Physical Multicast Channel (PMCH) transmissions, at most two of first OFDM symbols 404 of the MBSFN subframe 406 may be reserved for non-MBSFN transmission. In one aspect of the present disclosure, the OFDM symbol(s) 404 may comprise unicast control information for one or more supported user equipments (UEs).

The non-MBSFN symbol(s) 404 may utilize a cyclic prefix (CP) of the same length as used for a subframe #0 (i.e., a subframe 408) of a frame structure 410 that does not transmit PMCH. In one example, as illustrated in FIG. 4, the non-PMCH frame structure 410 may precede the MBSFN subframe 406. The CP utilized by the non-MBSFN symbol(s) 404 may be referred to as 'a normal CP', and its length may be referred to as 'a normal CP length'. On the other hand, the carrier supporting mixed PDSCH and PMCH transmissions may always utilize a CP of an extended length (i.e., a length larger than the normal CP length). This CP may be referred to as 'an extended CP'.

The subframe 408 may use either normal CP or extended CP for non-MBSFN transmissions. If the subframe 408 utilizes the CP of normal length and the MBSFN data symbols 402 utilize the CP of extended length, there may be a transmission gap 412 between the non-MBSFN control symbol(s) 404 and the MBSFN data symbols 402 since the non-MBSFN symbol(s) 404 may utilize the CP of normal length. Certain aspects of the present disclosure address the issue where this transmission gap is located, and how to align the transmission gap across a plurality of transmitting eNBs and receiving UEs in a wireless communications system.

Transmission Strategy in MBSFN Subframe

Figure 5:
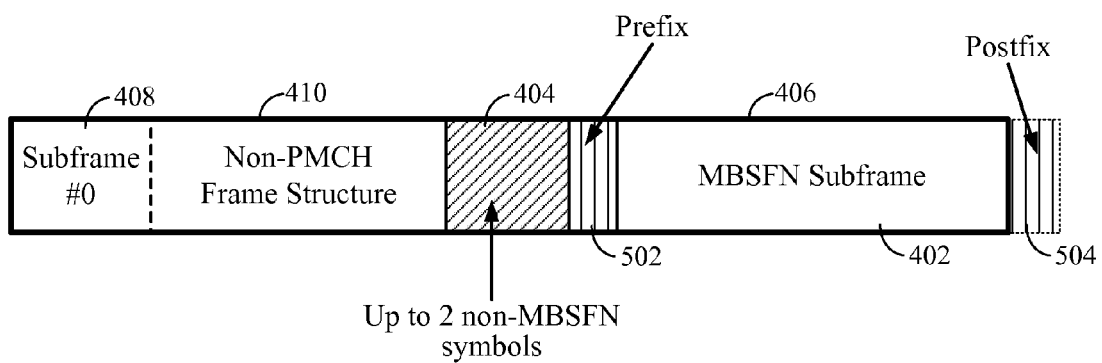
FIG. 5 illustrates an example of adjusting a transmission gap between MBSFN data and non-MBSFN symbols in accordance with certain aspects of the present disclosure.

In one aspect of the present disclosure, a gap between transmission of MBSFN data symbols and non-MBSFN control symbols may be split into a prefix and a postfix of the MBSFN transmission. As illustrated in FIG. 5, the transmission gap 412 from FIG. 4 may be split into a prefix 502 before the MBSFN portion 402 starts and into a postfix 504 after the MBSFN portion 402 ends. The splitting of transmission gap may be even or uneven, i.e., a length of the prefix 502 may be either equal to or different than a length of the postfix 504. Furthermore, the length of prefix 502 may be zero (i.e., the prefix 502 may not exist), or the length of postfix 504 may be zero (i.e., the postfix 504 may not exist).

In one aspect of the present disclosure, a serving eNB may signal to supported UEs at least one of the length of prefix 502 or the length of postfix 504. This information may be conveyed to the UEs by using, for example, higher layer signaling. Further, the eNB may set at least one of the prefix length or the postfix length to a defined value for a given transmission gap.

Referring back to FIG. 4, the length of transmission gap 412 may be calculated as follows. If there is one non-MBSFN symbol 404 within the MBSFN subframe 406 (i.e., an OFDM symbol 0), then the length of transmission gap 412 may be equal to the extended CP length subtracted by the normal CP length in the OFDM symbol 0. If there are two non-MBSFN symbols 404 in the MBSFN subframe 406 (i.e., OFDM symbols 0 and 1), the length of transmission gap 412 may be equal to twice the extended CP length subtracted by the normal CP length in the OFDM symbol 0 and by the normal CP length in the OFDM symbol 1.

Figure 6:
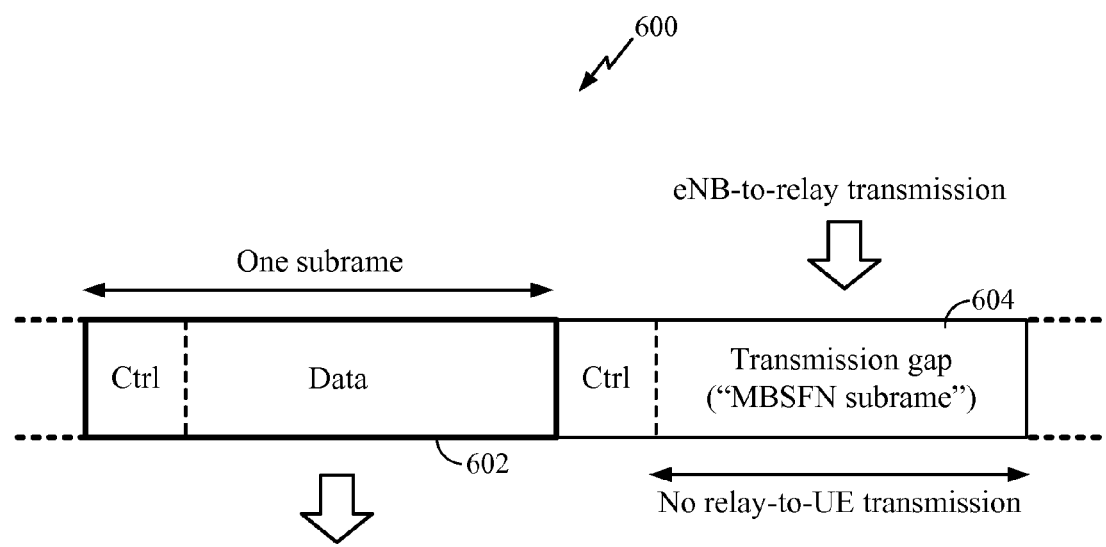
FIG. 6 illustrates an example non-MBSFN based transmission and MBSFN based reception at a relay node in accordance with certain aspects of the present disclosure.

The proposed splitting of transmission gap between MBSFN symbols and non-MBSFN symbols into adjustable prefix and postfix portions may allow for uplink/downlink switching in the case of relay transmission/reception. FIG. 6 illustrates an example non-MBSFN based transmission and MBSFN based reception at a relay node in accordance with certain aspects of the present disclosure. In a subframe 602, the relay may transmit data to one or more UEs. Since the data are dedicated to particular UEs, the subframe 602 may comprise non-MBSFN (unicast) symbols. In a following subframe 604, the relay may switch from a transmitting mode to a receiving mode in order to obtain data from an eNB. The data reception at the relay may be performed in one or more MBSFN subframes since multicast data may be received. Therefore, the subframe 604 may comprise MBSFN symbols. In a subsequent subframe following the subframe 604 (not shown in FIG. 6), the relay may switch back to the transmitting mode in order to transmit the previously received data to the one or more UEs. This transmission may be again performed using non-MBSFN symbols.

A certain time may be required for the relay to switch between the transmission mode and the reception mode. The proposed splitting of transmission gap between non-MBSFN and MBSFN symbols into adjustable prefix and postfix portions of the MBSFN subframe may thus yield an effective switching time for the relay. The prefix of the MBSFN subframe 604 with an adjustable length may provide a required time for the relay to switch from the transmission mode to the reception mode. On the other hand, the adjustable postfix of the MBSFN subframe 604 may provide a required time period during which the relay may switch from the reception mode to the transmission mode.

The proposed splitting of transmission gap into the prefix and postfix portions of adjustable lengths may be also beneficial for both LTE Release-8 systems and coordinated multi-point (CoMP) systems of Long Term Evolution Advanced (LTE-A) Release-10. In LTE Release-8, the proposed splitting of transmission gap may provide the alignment of timing across eNBs and UEs. All the eNBs may broadcast data at the aligned time, and the UEs may receive the data with the aligned timing. Without such alignment, the eNBs may transmit the broadcast data at different times hence defeating the purpose of MBSFN transmission. In addition, the UEs may start processing at different timing, which may result into significant performance loss for both control information and data.

The proposed splitting of transmission gap into the prefix and postfix portions of adjustable durations may also align the timing across eNBs and UEs in the CoMP wireless systems. In a CoMP set, one or more neighboring eNBs may start joint CoMP transmission at the aligned time, and supported UEs may receive data with the aligned timing. Without such aligning, joint CoMP transmission and reception may suffer from significant performance degradation.

Figure 7:
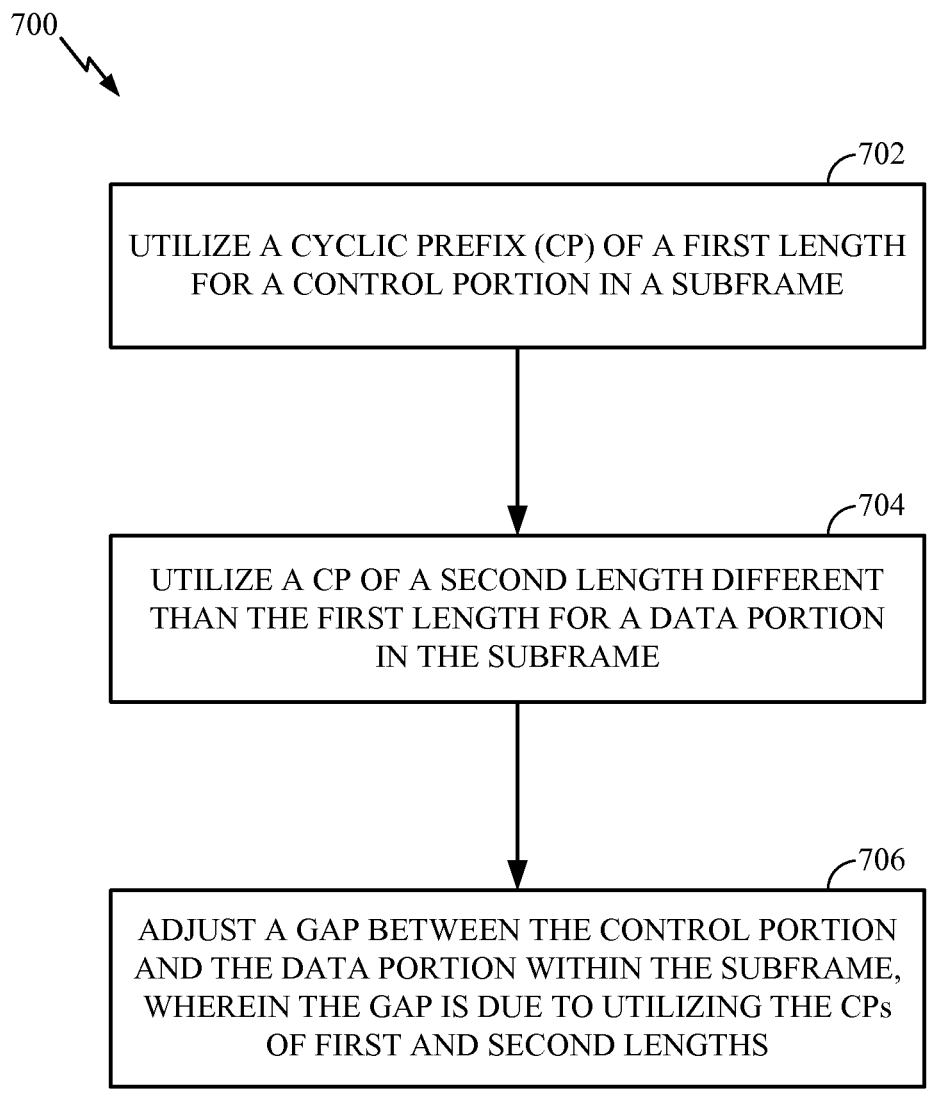
FIG. 7 is a functional block diagram conceptually illustrating example blocks that may be performed at a wireless node in accordance with certain aspects of the present disclosure.

FIG. 7 is a functional block diagram conceptually illustrating example blocks 700 executed at a wireless node (e.g., an access point or a relay) in accordance with certain aspects of the present disclosure. Operations illustrated by the blocks 700 may be executed, for example, at the processor(s) 214, 220 and/or 230 of the access point 210 from FIG. 2.

The operations may begin, at block 702, by utilizing, by the wireless node, a cyclic prefix (CP) of a first length for a control portion in a subframe. At block 704, the wireless node may utilize a CP of a second length different than the first length for a data portion in the subframe. At block 706, the wireless node may adjust a gap between the control portion and the data portion within the subframe, wherein the gap may be due to utilizing the CPs of first and second lengths.

It should be noted that the subframe may comprise an MBSFN subframe. The control portion may comprise at most two non-MBSFN symbols, and the data portion may comprise one or more MBSFN symbols. The gap may comprise at least one of a prefix of the data portion or a postfix of the data portion, wherein adjusting the gap may comprise adjusting at least one of a length of the prefix or a length of the postfix.

In one configuration, the apparatus 210 for wireless communication includes means for utilizing a CP of a first length for a control portion in a subframe, means for utilizing a CP of a second length different than the first length for a data portion in the subframe, and means for adjusting a gap between the control portion and the data portion within the subframe, wherein the gap may be due to utilizing the CPs of first and second lengths. In one aspect, the aforementioned means may be the processors 214, 220 and 230 configured to perform the functions recited by the aforementioned means. In another aspect, the aforementioned means may be a module or any apparatus configured to perform the functions recited by the aforementioned means.

Figure 8:
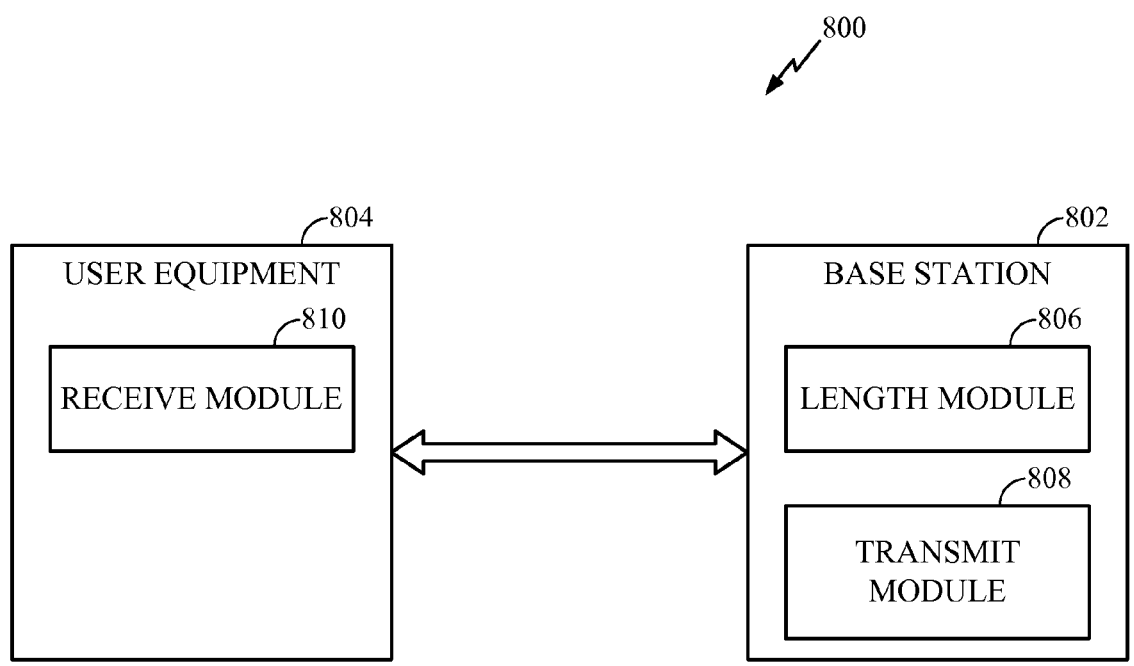
FIG. 8 illustrates an example system that facilitates adjusting a transmission gap between MBSFN data and non-MBSFN symbols in accordance with certain aspects of the present disclosure.

FIG. 8 illustrates an example system 800 that facilitates adjusting a gap between MBSFN and non-MBSFN transmissions in accordance with certain aspects of the present disclosure. In one aspect, the adjusting may comprise splitting the gap as a prefix before the MBSFN transmission starts and as a postfix when the MBSFN transmission ends.

The system 800 may comprise a base station 802 (e.g., access point, Node B, eNB, and so on) that may communicate with a UE 804 (e.g., mobile station, mobile device, and/or any number of disparate devices (not shown)). The base station 802 may transmit information to the UE 804 over a forward link channel or downlink channel; further the base station 802 may receive information from the UE 804 over a reverse link channel or uplink channel. Moreover, the system 800 may be a MIMO system. Additionally, the system 800 may operate in an OFDMA wireless network (such as 3GPP, 3GPP2, 3GPP LTE, LTE-A, and so on). Also, in an aspect, the components and functionalities shown and described below in the base station 802 may be present in the UE 804 and vice versa.

The base station 802 may comprise a length module 806 that may configure at least one of a length of the prefix or a length of the postfix. The length module 806 may fix at least one of the length of prefix or the length of postfix for a given duration of the transmission gap. The base station 802 may further comprise a transmit module 808 that may communicate the at least one of prefix length or postfix length to the UE 804. It is to be appreciated that the transmit module 808 may utilize a higher layer signaling to communicate the at least one of prefix length or postfix length to the UE 804.

The UE 804 may comprise a receive module 810 that may receive at least one of the prefix length or the postfix length transmitted from the base station 802. Based on the received information about the at least one of prefix length or postfix length, the receive module 810 may be able to determine location of the gap between MBSFN data and non-MBSFN data. The determined location of the transmission gap me be utilized at the receive module 810 to align processing of the received MBSFN data with other UEs (not shown) in the system 800.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
    utilizing a cyclic prefix of a first length for a control portion in a subframe;
    utilizing a cyclic prefix of a second length different than the first length for a data portion in the subframe; and
    adjusting a transmission gap between the control portion and the data portion within the subframe, wherein the transmission gap corresponds to a gap between transmission of control symbols in the control portion and transmission of data symbols in the data portion in the subframe, and wherein the transmission gap is present when utilizing the cyclic prefixes of the first and second lengths for the control and data portions, respectively, and is absent when utilizing cyclic prefixes of same length for the control and data portions; wherein the subframe comprises a Multicast Broadcast Single Frequency Network subframe; and wherein the transmission gap comprises at least one of a prefix of the data portion or a postfix of the data portion.

2. The method of claim 1, wherein:
    the control portion comprises at most two non Multicast Broadcast Single Frequency Network symbols, and
    the data portion comprises one or more Multicast Broadcast Single Frequency Network symbols.

3. The method of claim 1, wherein adjusting comprises:
    adjusting at least one of a length of the prefix or a length of the postfix.

4. The method of claim 1, further comprising:
    signaling at least one of a length of the prefix or a length of the postfix.

5. The method of claim 1, further comprising:
    setting at least one of a length of the prefix or a length of the postfix to a defined value.

6. The method of claim 1, wherein the control portion comprises data transmitted to one or more apparatuses, and the data portion comprises data received from another apparatus, and the method further comprising:
   switching from data transmission to data reception during the prefix; and
   switching from data reception to data transmission during the postfix.

7. The method of claim 1, further comprising:
   broadcasting the data portion simultaneously with broadcasting of data from one or more neighboring apparatuses, wherein
   the transmission gap is utilized at each of the one or more neighboring apparatuses between data and control portions of said each neighboring apparatus.

8. The method of claim 1, further comprising:
   aligning, based on the transmission gap, transmission of the data portion with transmission of data from one or more neighboring apparatuses, wherein
   the transmission gap is utilized at each of the one or more neighboring apparatuses between data and control portions of said each neighboring apparatus.

9. An apparatus for wireless communications, comprising:
   at least one processor; and
   a memory coupled to the at least one processor, wherein the at least one processor is configured to
      utilize a cyclic prefix of a first length for a control portion in a subframe,
      utilize a cyclic prefix of a second length different than the first length for a data portion in the subframe, and
      adjust a transmission gap between the control portion and the data portion within the subframe, wherein the transmission gap corresponds to a gap between transmission of control symbols in the control portion and transmission of data symbols in the data portion in the subframe, and wherein the transmission gap is present when utilizing the cyclic prefixes of the first and second lengths for the control and data portions, respectively, and is absent when utilizing cyclic prefixes of same length for the control and data portions; wherein the subframe comprises a Multicast Broadcast Single Frequency Network subframe; and wherein the transmission gap comprises at least one of a prefix of the data portion or a postfix of the data portion.

10. The apparatus of claim 9, wherein:
    the control portion comprises at most two non Multicast Broadcast Single Frequency Network symbols, and
    the data portion comprises one or more Multicast Broadcast Single Frequency Network symbols.

11. The apparatus of claim 9, wherein the at least one processor is also configured to:
    adjust at least one of a length of the prefix or a length of the postfix.

12. The apparatus of claim 9, wherein the at least one processor is also configured to:
    signal at least one of a length of the prefix or a length of the postfix.

13. The apparatus of claim 9, wherein the at least one processor is also configured to:
    set at least one of a length of the prefix or a length of the postfix to a defined value.

14. The apparatus of claim 9, wherein the control portion comprises data transmitted to one or more apparatuses, the data portion comprises data received from another apparatus, and the at least one processor is also configured to:
    switch from data transmission to data reception during the prefix; and
    switch from data reception to data transmission during the postfix.

15. The apparatus of claim 9, wherein the at least one processor is also configured to:
    broadcast the data portion simultaneously with broadcasting of data from one or more neighboring apparatuses, and wherein
    the transmission gap is utilized at each of the one or more neighboring apparatuses between data and control portions of said each neighboring apparatus.

16. The apparatus of claim 9, wherein the at least one processor is also configured to:
    align, based on the transmission gap, transmission of the data portion with transmission of data from one or more neighboring apparatuses, and wherein
    the transmission gap is utilized at each of the one or more neighboring apparatuses between data and control portions of said each neighboring apparatus.

17. An apparatus for wireless communications, comprising:
    means for utilizing a cyclic prefix of a first length for a control portion in a subframe;
    means for utilizing a cyclic prefix of a second length different than the first length for a data portion in the subframe; and
    means for adjusting a transmission gap between the control portion and the data portion within the subframe, wherein the transmission gap corresponds to a gap between transmission of control symbols in the control portion and transmission of data symbols in the data portion in the subframe, and wherein the transmission gap is present when utilizing the cyclic prefixes of the first and second lengths for the control and data portions, respectively, and is absent when utilizing cyclic prefixes of same length for the control and data portions; wherein the subframe comprises a Multicast Broadcast Single Frequency Network subframe; and wherein the transmission gap comprises at least one of a prefix of the data portion or a postfix of the data portion.

18. The apparatus of claim 17, wherein:
    the control portion comprises at most two non Multicast Broadcast Single Frequency Network symbols, and
    the data portion comprises one or more Multicast Broadcast Single Frequency Network symbols.

19. The apparatus of claim 17, wherein the means for adjusting comprises:
    means for adjusting at least one of a length of the prefix or a length of the postfix.

20. The apparatus of claim 17, further comprising:
    means for signaling at least one of a length of the prefix or a length of the postfix.

21. The apparatus of claim 17, further comprising:
    means for setting at least one of a length of the prefix or a length of the postfix to a defined value.

22. The apparatus of claim 17, wherein the control portion comprises data transmitted to one or more apparatuses, and the data portion comprises data received from another apparatus, and the apparatus further comprising:
    means for switching from data transmission to data reception during the prefix; and
    means for switching from data reception to data transmission during the postfix.

23. The apparatus of claim 17, further comprising:
    means for broadcasting the data portion simultaneously with broadcasting of data from one or more neighboring apparatuses, wherein the transmission gap is utilized at each of the one or more neighboring apparatuses between data and control portions of said each neighboring apparatus.

24. The apparatus of claim 17, further comprising:
means for aligning, based on the transmission gap, transmission of the data portion with transmission of data from one or more neighboring apparatuses, wherein
the transmission gap is utilized at each of the one or more neighboring apparatuses between data and control portions of said each neighboring apparatus.

25. A computer program product, comprising a non-transitory computer-readable medium comprising code for:
utilizing a cyclic prefix of a first length for a control portion in a subframe;
utilizing a cyclic prefix of a second length different than the first length for a data portion in the subframe; and
adjusting a transmission gap between the control portion and the data portion within the subframe, wherein the transmission gap corresponds to a gap between transmission of control symbols in the control portion and transmission of data symbols in the data portion in the subframe, and wherein the transmission gap is present when utilizing the cyclic prefixes of the first and second lengths for the control and data portions, respectively, and is absent when utilizing cyclic prefixes of same length for the control and data portions; wherein the subframe comprises a Multicast Broadcast Single Frequency Network subframe; and wherein the transmission gap comprises at least one of a prefix of the data portion or a postfix of the data portion.

26. The computer program product of claim 25, wherein:
the control portion comprises at most two non Multicast Broadcast Single Frequency Network symbols, and
the data portion comprises one or more Multicast Broadcast Single Frequency Network symbols.

27. The computer program product of claim 25, wherein the non-transitory computer-readable medium further comprising code for:
adjusting at least one of a length of the prefix or a length of the postfix.

28. The computer program product of claim 25, wherein the non-transitory computer-readable medium further comprising code for:
signaling at least one of a length of the prefix or a length of the postfix.

29. The computer program product of claim 25, wherein the non-transitory computer-readable medium further comprising code for:
setting at least one of a length of the prefix or a length of the postfix to a defined value.

30. The computer program product of claim 25, wherein the control portion comprises data transmitted to one or more apparatuses, the data portion comprises data received from another apparatus, and the non-transitory computer-readable medium further comprising code for:
switching from data transmission to data reception during the prefix; and
switching from data reception to data transmission during the postfix.

31. The computer program product of claim 25, wherein the non-transitory computer-readable medium further comprising code for:
broadcasting the data portion simultaneously with broadcasting of data from one or more neighboring apparatuses, and wherein
the transmission gap is utilized at each of the one or more neighboring apparatuses between data and control portions of said each neighboring apparatus.

32. The computer program product of claim 25, wherein the non-transitory computer-readable medium further comprising code for:
aligning, based on the transmission gap, transmission of the data portion with transmission of data from one or more neighboring apparatuses, and wherein
the transmission gap is utilized at each of the one or more neighboring apparatuses between data and control portions of said each neighboring apparatus.

* * * * *